United States Patent [19]

Bissell

[11] 4,276,400
[45] Jun. 30, 1981

[54] OLEFIN POLYMERIZATION PROCESS USING PRETREATED CATALYST

[75] Inventor: Reeder E. Bissell, Longview, Tex.

[73] Assignee: Eastman Kodak Company, Rochester, N.Y.

[21] Appl. No.: 48,209

[22] Filed: Jun. 13, 1979

Related U.S. Application Data

[63] Continuation of Ser. No. 837,113, Sep. 28, 1977, abandoned.

[51] Int. Cl.$^3$ .......................... C08F 4/66; C08F 10/06
[52] U.S. Cl. ................... 526/152; 252/429 B; 525/247; 526/65; 526/351; 526/904
[58] Field of Search ................ 526/152, 903, 904, 65; 525/247

[56] References Cited

U.S. PATENT DOCUMENTS

| | | | |
|---|---|---|---|
| 3,067,183 | 12/1962 | Hagemeyer et al. | 526/159 |
| 3,679,775 | 7/1972 | Hagemeyer et al. | 526/152 |
| 3,893,989 | 7/1975 | Leicht et al. | 526/73 |

FOREIGN PATENT DOCUMENTS

| | | | |
|---|---|---|---|
| 2022414 | 7/1970 | France | 526/904 |
| 1300734 | 12/1972 | United Kingdom | 526/904 |
| 1384603 | 2/1975 | United Kingdom | 526/903 |

*Primary Examiner*—Edward J. Smith
*Attorney, Agent, or Firm*—Clyde L. Tootle; Daniel B. Reece, III

[57] ABSTRACT

Process for polymerizing alpha-olefins employing a pretreated catalyst comprising an organopolylithiumaluminum compound prepared by reacting lithium compounds selected from the group consisting of lithium hydride and lithium alkyl with at least one aluminum compound selected from the group consisting of aluminum trialkyl and dialkyl aluminum hydride, an alkyl compound selected from the group consisting of lithium alkyl, aluminum trialkyl and dialkyl aluminum hydride and the alpha form of $TiCl_3$. This catalyst is pretreated by initially polymerizing alpha-olefins with the catalyst under slurry polymerization conditions to form a small amount of prepolymer. The catalyst and small amount of prepolymer is then used to polymerize alpha-olefins subsequently under solution conditions in solution commercial polymerization processes operated at temperatures above 140° C. over extended periods of time. This pretreatment increases the activity of the catalyst, as well as the amount of crystalline polymer obtained.

9 Claims, No Drawings

OLEFIN POLYMERIZATION PROCESS USING PRETREATED CATALYST

This is a continuation of application Ser. No. 837,113, filed Sept. 28, 1977, now abandoned.

The present invention relates to a method for activating an olefin polymerization catalyst which results in greatly improved catalyst activity and an improvement in the stereospecificity of the pretreated catalyst.

Various methods have been used for increasing the catalyst activity and stereospecificity of ionic olefin polymerization catalyst. The prior art discloses various forms of chemical and mechanical treatment of the catalyst such as by use of third components, grinding of the catalyst or catalyst components, washing and many other forms of catalyst pretreatment to improve catalyst activity or stereospecificity. These prior art processes, however, relate primarily to catalysts useful in slurry or fluidized bed (gas phase) processes. One such process is disclosed in U.S. Pat. No. 2,936,302, where the catalyst is formed and the catalyst heated in the presence of a small amount of an alpha-olefin containing 2 to 8 carbon atoms. The pretreated catalyst is then cooled and thereafter added to a process whereby the pretreated catalyst is contacted with alpha-olefins and the alpha-olefins polymerized under slurry conditions.

The present process, however, is directed to the preactivation of a catalyst employed in a solution process by reacting the catalyst under slurry conditions and then using the preactivated catalyst in a solution process. It has been found that subjecting the $TiCl_3$ based olefin polymerization catalysts of U.S. Pat. No. 3,679,775 to propylene under slurry polymerization conditions to form a relatively small amount of slurry polymer prior to use in solution polymerization or copolymerization of olefins results in catalyst activity 4–10 times greater than that attainable under solution polymerization conditions with the corresponding untreated catalysts. This significantly increased solution polymerization activity is accompanied also by a significant increase in the stereoregularity or crystallinity of the polymers formed by such process. While the level of crystallinity of the polymer made in a solution process with the preactivated catalyst may be varied somewhat by varying the mole ratio of the initial catalyst components, increases of 5–6 hexane index units are easily attainable in conjunction with the improved catalyst activity by proper selection of catalyst component mole ratio and level of slurry prepolymerization preactivation.

It should also be noted that catalyst of U.S. Pat. No. 3,679,775 can be prepared by preparing the organopolylithiumaluminum compound which can be isolated and then added to the other catalyst components to prepare the novel catalyst. The catalyst can also be prepared by merely mixing the catalyst components together and preparing the organopolylithiumaluminum compound in situ and then adding this reaction mixture to the process without isolating this particular catalyst component.

The pretreated or preactivated catalysts of the present invention offer commercially significant advantages in the solution polymerization of alpha-olefins to form homo- and copolymers. For example, the preactivated catalysts may provide an at least 400% increase in catalyst activity which results in a major reduction in the amount of the expensive catalyst components and consequently results in major catalyst cost savings. Also, the reduced catalyst concentrations in the solution polymerization process stream employing the improved catalyst results in additional savings in catalyst removal steps because of reduced loads on filters and beds used for catalyst removal. Catalyst concentrations are generally so low that it is possible simply to filter the polymer solution to obtain products with residual ash contents low enough to be used for most commercial uses. Also, the increased stereospecificity of the preactivated catalyst provides a significant reduction in production of the less valuable atactic polymer which is normally formed as a coproduct with the crystalline polymer.

The preactivated catalysts may be used as a direct replacement for the non-preactivated catalyst without any detectable change in the crystalline polymer produced. Therefore, the preactivation of the catalyst provides a more active and more stereospecific catalyst without changing the properties of the polymer obtained with such catalyst.

Preactivation of the catalysts by slurry prepolymerization also imparts excellent activity stability to the catalysts. The preactivated catalysts may be stored for days and even months without any significant loss of solution polymerization activity or stereospecificity.

Preactivation of the catalyst according to the present invention also reduces the tendency of the catalyst solids to settle from suspension, thus facilitating the maintenance of uniform catalyst slurries necessary for reliable metering to the solution polymerization reactors.

According to the present invention, the catalysts of the present invention are preactivated by contacting the organopolylithiumaluminum compound containing catalyst with propylene under slurry polymerization conditions until sufficient prepolymer is formed to impart the desired level of catalyst activity in the subsequent high temperature solution olefin polymerization or copolymerization. Preferably, the initial catalyst concentrations are limited such that the total solids content after the slurry prepolymerization step does not exceed 15–20% to facilitate handling although highly active catalysts can be prepared at much higher solids levels.

The ratio of slurry prepolymer to $TiCl_3$ is normally limited to less than about 16 pounds of prepolymer per pound of $TiCl_3$. Activity of the slurry preactivated catalysts increases linearly with increasing slurry prepolymer/$TiCl_3$ ratio to a ratio of about 10–16 pounds slurry prepolymer/pound $TiCl_3$. Current evidence indicates that no further significant improvements in activity are realized when the slurry prepolymer/$TiCl_3$ ratio is increased beyond about 16 pounds per pound.

The slurry prepolymerization preactivation step is carried out with the catalyst in hydrocarbon slurry in mineral spirits at 0° C. to 80° C., preferably 30°–60° C., and under 5 to 1,200 psig, preferably 35–50 psig propylene pressure. Activated catalysts can also be prepared at lower temperatures and lower propylene pressure, but the time required to reach the desired level of preactivation is considerably increased. Conversely, the preactivation may be carried out at higher temperatures and pressures, the only limitation being that the preactivation temperature must not be allowed to increase sufficiently to introduce handling problems arising from agglomeration of the slurry prepolymer particles. The preactivated catalysts may be prepared batchwise and stored for extended periods of time prior to use or, conversely, the preactivation may be done continuously and the catalyst fed directly to the high temperature solution polymerization reactors.

The slurry prepolymers formed in the preferred temperature and pressure range of 30°–60° C. and 35–50 psig propylene pressure in the absence of added chain transfer agents are normally high molecular weight polymers in the 3–3.5 inherent viscosity range. The prepolymer inherent viscosity may be readily controlled to match the inherent viscosity of the solution polymer to be produced by addition of hydrogen or other suitable chain transfer agents during the slurry prepolymerization preactivation process. Thus, prepolymer molecular weight control to match the average molecular weight of the solution polymer to be produced can further reduce the already negligible possibility of imparting undesirable property variations to the final product polymer. Since the slurry prepolymer represents normally less than 1% of the final polymer from the solution process, it is generally not necessary to control the molecular weight of the slurry prepolymer. Stereospecificity of the preactivated catalyst may be adjusted significantly to meet the varying needs for the atactic polymer coproduct by adjusting the mole ratio of the starting catalyst components.

The preactivated catalyst of the present invention can be used in a process as disclosed in U.S. Pat. No. 3,679,775, the teachings of which are incorporated herein by reference. As noted above, the preactivated catalyst can be used in place of the catalyst of this patent. The process can be employed as disclosed in U.S. Pat. No. 3,600,463, the teachings of which are incorporated herein by reference.

This invention can be further illustrated by the following examples although it will be understood that these examples are included merely for purposes of illustration and are not intended to limit the scope of the invention.

EXAMPLE 1

As noted hereinabove, prepolymerization of propylene under slurry conditions to form a small amount of slurry polypropylene relative to the amount of catalyst present results in marked increases in catalyst activity and polymer crystallinity when the catalyst is used in subsequent olefin polymerization or copolymerization under high temperature solution polymerization conditions. This and subsequent examples will serve to illustrate the improvements imparted to the high temperature solution polymerization catalysts by preactivation through low conversion slurry prepolymerization.

Catalyst Preparation and Preactivation

A slurry of organopolylithiumaluminum compound in mineral spirits was prepared by reacting at ambient temperature under inert conditions 19.4 ml. of 15% n-butyl lithium in mineral spirits ($3.4224 \times 10^{-2}$ moles) with 21.4 ml. 25% aluminum triethyl in heptane ($3.4224 \times 10^{-2}$ moles) in 759 ml. of added mineral spirits.

A catalyst slurry was prepared by mixing under inert conditions in a 1000 ml. agitated reactor 140 ml. mineral spirits, 2.1 grams of the alpha form of $TiCl_3$ ($1.361 \times 10^{-2}$ moles) and 105 ml. of the organopolylithiumaluminum compound described above to provide a Li/Al/Ti mole ratio of 0.33/0.33/1. The catalyst was heated with agitation to 50° C. and pressured to 50 psig propylene. The resulting slurry propylene polymerization reaction was allowed to continue for 90 minutes at 50°–60° C. with incremental propylene addition to maintain the reactor pressure in the 48–50 psig range. At the end of the reaction period the reactor was vented, cooled and weighed. The resultant preactivated catalyst slurry contained approximately 12 g. slurry prepolymer per gram of $TiCl_3$ as indicated by weight gain. A portion of the preactivated catalyst slurry was treated with acetylacetone to remove catalyst residues, washed with acetone, stabilized and dried. The polymer recovered exhibited an IV of 3.5 and a crystallinity of about 90% as determined by extraction with refluxing hexane.

High Temperature Solution Propylene Polymerization

A 43 ml. portion of the preactivated catalyst prepared as described above and containing 0.3 g. $TiCl_3$, sufficient co-catalyst to provide a Li/Al/Ti mole ratio of 0.33/0.33/1, and 3.6 g. of polypropylene formed in the preactivation step was charged to a 2-liter stirred stainless steel autoclave containing propylene at 1000 psig and 160° C. with 800 ml. mineral spirits. Propylene pressure was maintained at 1000 psig and autoclave temperature at 160° C. The reaction was run for 2 hours. At the end of the reaction period, the product was dumped from the autoclave, cooled, washed with acetone, stabilized and dried. The resulting polymer powder weighed 166 g. and exhibited 83.6% crystallinity as determined by extraction of the powder with refluxing hexane. Flow rate for the hexane insoluble polymer was 1.38. The polymer yield of 166 g. represents a polymerization rate of 277 g. polymer/g. $TiCl_3$/hr.

The improved solution polymerization activity imparted to the catalyst by slurry prepolymerization is illustrated by the results of the following control experiments conducted as described above with the omission of the slurry prepolymerization step:

0.3 g. $TiCl_3$ and 15 ml. of the co-catalyst slurry were mixed to provide a Li/Al/Ti mole ratio of 0.33/0.33/1 and charged to the autoclave for polymerization at 1000 psig propylene pressure and 160° C. as described above. Polymer yield after 2 hours' reaction time was negligible. When the catalyst charge was increased to 0.6 g. $TiCl_3$ and 30 ml. of the co-catalyst slurry, 2 hour solution polymerization at 160° C. and 1000 psig propylene produced 100 g. of polypropylene which exhibited a powder hexane index of 78.1 and a flow rate of 1.43. The polymer yield of 100 g. represents a polymerization rate of 83 g. polymer/g. $TiCl_3$/hr.

EXAMPLE 2

A series of preactivated catalysts was prepared by subjecting catalyst slurries prepared from $TiCl_3$, n-butyl lithium and aluminum triethyl at the Li/Al/Ti mole ratio 0.33/0.33/1 to propylene under slurry polymerization conditions as described in Example 1. The slurry polymerization time was varied to provide preactivated catalysts containing from 3 to 28 g. slurry polypropylene per gram of $TiCl_3$. These catalysts were compared in 2 hr. solution propylene polymerizations at 160° C., 1000 psig propylene. Control solution propylene polymerizations were conducted under the same conditions using catalysts not subjected to slurry prepolymerization. The results of these evaluations as summarized in Table 1 show that the solution polymerization activity of the preactivated catalysts increases with increasing slurry prepolymer/$TiCl_3$ ratio over the range 0–15 grams slurry prepolymer/gram $TiCl_3$.

TABLE 1

| | Lbs. Slurry Polymer/TiCl$_3$ | Activity Index* |
|---|---|---|
| Run 1 | 0 | 1 |
| Run 2 | 2 | 1.4 |
| Run 3 | 4 | 1.9 |
| Run 4 | 6 | 2.4 |
| Run 5 | 8 | 2.8 |
| Run 6 | 10 | 3.3 |
| Run 7 | 12 | 3.8 |
| Run 8 | 14 | 4.2 |
| Run 9 | 16 | 4.3 |
| Run 10 | 18 | 4.4 |
| Run 11 | 20 | 4.4 |
| Run 12 | 22 | 4.4 |
| Run 13 | 24 | 4.4 |
| Run 14 | 26 | 4.4 |
| Run 15 | 28 | 4.4 |

*Activity Index = $\dfrac{\text{Activity for preactivated catalyst}}{\text{Activity for nonpreactivated catalyst}}$

EXAMPLE 3

A series of preactivated catalysts was prepared as described in Example 1 except that the Li/Al/Ti mole ratio was varied within the range 0.1-0.5/0.25-1.0/1. The level of preactivation was controlled within the range 12-13 grams slurry polymer/g. TiCl$_3$. These catalysts were evaluated in 2-liter stirred autoclave solution propylene polymerizations at 1000 psig propylene pressure, 160° C., and 2 hr. reaction time in comparison with control runs using catalysts not subjected to slurry prepolymerization. Results of these comparisons are summarized in Table 2. These results show that the Li/Al/Ti mole ratio of 0.33/0.33/1 gives the best combination of catalyst activity and polymer hexane index. At the Li/Al/Ti mole ratio of 0.33/0.33/1 the preactivated catalyst exhibited solution polymerization activity 4.9 times greater than non-preactivated controls and the polymer powder hexane index was 5.5 percent units higher than that of the non-preactivated control.

TABLE 2

Evaluation of Preactivated (PAC) Catalyst at Different Mole Ratios

| Catalyst | No. of Runs | Catalyst Activity g PP/g Cat./Hr. | Catalyst Activity g PP/g TiCl$_3$/Hr. | Activity Index (Total Cat.) | Activity Index (TiCl$_3$) | Powder Hexane Index | Flow Rate |
|---|---|---|---|---|---|---|---|
| PAC @ 0.1/0.33/1* | 9 | 350.3 | 450.0 | 5.2 | 4.8 | 76.1 | 2.04 |
| Control** | 9 | 66.9 | 92.8 | | | 76.5 | 0.79 |
| PAC @ 0.1/1/1 | 4 | 378.8 | 674.3 | 5.1 | 6.5 | 72.6 | 3.02 |
| Control | 5 | 74.9 | 103.8 | | | 75.7 | 0.85 |
| PAC @ 0.33/0.33/1 | 7 | 244.9 | 339.9 | 4.9 | 4.9 | 80.7 | 1.34 |
| Control | 10 | 49.9 | 69.1 | | | 75.2 | 1.05 |
| PAC @ 0.33/0.66/1 | 5 | 238.1 | 386.6 | 3.8 | 4.4 | 78.0 | 1.30 |
| Control | 3 | 62.9 | 87.2 | | | 76.2 | 0.96 |
| PAC @ 0.33/1/1 | 11 | 176.7 | 331.5 | 3.6 | 4.9 | 77.6 | 1.29 |
| Control | 10 | 49.3 | 67.8 | | | 75.5 | 1.02 |
| PAC @ 0.5/1/1 | 9 | 109.0 | 212.3 | 2.4 | 3.4 | 78.5 | 1.12 |
| Control | 7 | 45.5 | 63.1 | | | 77.5 | 1.28 |
| PAC @ 0.5/0.25/1 | 6 | 118.8 | 165.6 | 2.7 | 2.7 | 79.8 | 1.21 |
| Control | 6 | 44.2 | 62.0 | | | 75.2 | 1.40 |
| PAC @ 0.5/0.5/1 | 6 | 128.9 | 202.3 | 2.8 | 3.2 | 80.4 | 0.78 |
| Control | 6 | 45.4 | 62.8 | | | 76.6 | 1.38 |
| PAC @ 0.2/0.33/1 | 6 | 231.4 | 307.0 | 4.8 | 4.6 | 76.4 | 2.20 |
| Control | 5 | 48.4 | 66.9 | | | 73.3 | 1.58 |
| PAC @ 0.25/0.25/1 | 5 | 274.2 | 353.7 | 4.4 | 4.1 | 78.9 | 3.11 |
| Control | 6 | 61.8 | 85.6 | | | 73.1 | 1.48 |
| PAC @ 0.33/0.25/1 | 5 | 232.8 | 308.1 | 3.5 | 3.4 | 76.8 | 2.16 |
| Control | 4 | 66.4 | 91.9 | | | 72.4 | 2.21 |
| PAC @ 0.25/0.50/1 | 3 | 276.2 | 407.0 | 4.5 | 4.8 | 74.2 | 1.62 |
| Control | 3 | 61.7 | 85.3 | | | 71.9 | 1.15 |

*Catalyst is expressed as the mole ratio of lithium/aluminum/titanium and is preactivated (PAC) by heating at 60° C. under 50 psi of propylene.
**Control is the catalyst which has not been pretreated or preactivated and has a lithium/aluminum/titanium mole ratio of 0.33/0.33/1.

TABLE 3

Evaluation of Preactivated Catalyst Made in Presence of Hydrogen For Prepolymer I.V. Control

| Preactivation Conditions | *Catalyst Preactivation Preactivation Level g. Slurry Poly./g. TiCl$_3$ | Slurry Prepolymer I.V. | Solu. Propylene Polymerization, 160° C. 1000 PSIG Catalyst Activity g. Poly./g. TiCl$_3$/Hr. | Powder Hexane Index | Flow Rate After Hexane Extraction | No. of Runs Averaged |
|---|---|---|---|---|---|---|
| 60° C., 50 PSIG C$_3$H$_6$ | 13.3 | 3.15 | 251.3 | 78.0 | 1.12 | 4 |
| None (Control) | 0 | — | 79.9 | 77.0 | 1.06 | 7 |
| 60° C., 50 PSIG C$_3$H$_6$ | 12.5 | 3.23 | 254.4 | 81.8 | 1.27 | 5 |
| None (Control) | 0 | — | 86.3 | 77.8 | 1.66 | 6 |
| 60° C., 50 PSIG C$_3$H$_6$ + H$_2$ | 12.8 | 2.30 | 294.1 | 82.3 | 1.25 | 6 |
| None (Control) | 0 | — | 89.8 | 76.8 | 1.86 | 5 |
| 60° C., 50 PSIG C$_3$H$_6$ + H$_2$ | 12.3 | 2.05 | 271.8 | 83.6 | 1.38 | 4 |
| None (Control) | 0 | — | 91.3 | 78.1 | 1.43 | 7 |
| 60° C., 50 PSIG C$_3$H$_6$ + H$_2$ | 9.8 | 1.80 | 246.7 | 80.4 | 1.07 | 4 |
| None (Control) | 0 | — | 91.7 | 77.0 | 1.75 | 5 |
| 60° C., 50 PSIG C$_3$H$_6$ + H$_2$ | 13.3 | 1.57 | 310.0 | 78.1 | 2.03 | 5 |
| None (Control) | 0 | — | 77.3 | 77.4 | 1.04 | 8 |
| 60° C., 50 PSIG C$_3$H$_6$ + H$_2$ | 8.9 | 1.50 | 263.3 | 79.0 | 1.47 | 6 |
| None (Control) | 0 | — | 90.4 | 76.8 | 1.70 | 7 |
| 60° C., 50 PSIG C$_3$H$_6$ + H$_2$ | 11.9 | 1.40 | 310.0 | 79.0 | 1.64 | 5 |

TABLE 3-continued

| | Evaluation of Preactivated Catalyst Made in Presence of Hydrogen For Prepolymer I.V. Control | | | | | |
|---|---|---|---|---|---|---|
| | *Catalyst Preactivation | | | Solu. Propylene Polymerization, 160° C. 1000 PSIG | | |
| | | | | | Flow Rate | |
| Preactivation Conditions | Preactivation Level g. Slurry Poly./g. TiCl$_3$ | Slurry Prepolymer I.V. | Catalyst Activity g. Poly./g. TiCl$_3$/Hr. | Powder Hexane Index | After Hexane Extraction | No. of Runs Averaged |
| None (Control) | 0 | — | 77.3 | 77.8 | 1.61 | 5 |

*All catalysts were composed of LiBu/AlEt$_3$/TiCl$_3$ in Mole Ratio 0.33/0.33/1

EXAMPLE 4

A series of preactivated catalysts was prepared following exactly the procedures of Example 1 except that hydrogen was mixed with the propylene used in the slurry propylene polymerization step to reduce the molecular weight of the slurry polypropylene formed. The slurry polypropylene I.V., which normally falls in the 3–3.5 range in the absence of hydrogen, was reduced to as low as 1.4 by the use of hydrogen as chain transfer agent. These catalysts were evaluated in 2 hr. solution propylene polymerizations at 160° C., 1000 psig propylene in comparison with non-preactivated catalysts and catalysts preactivated in absence of hydrogen as described in Example 1. Results of these comparisons are summarized in Table 3. These results show that the preactivated catalyst activity is not adversely affected by the use of hydrogen as chain transfer agent during the slurry polymerization step.

EXAMPLE 5

An 800 gallon batch of preactivated catalyst was prepared in a 1000 gallon stirred reactor following a scale-up of the basic procedures outlined in Example 1. The catalyst batch contained 58 pounds of a TiCl$_3$ and sufficient n-butyl lithium and aluminum triethyl to provide a Li/Al/Ti mole ratio of 0.33/0.33/1. During the slurry polymerization preactivation step, the reaction temperature was controlled between 55° C. and 60 ° C. by external cooling. At the end of the propylene polymerization period, the reactor was vented, spraged with dry nitrogen to remove residual propylene, cooled and held under inert conditions with continued stirring for use in solution polymerization studies. The finished preactivated catalyst batch contained 10.0 pounds slurry polypropylene per pound of TiCl$_3$ and 12.8% total solids.

The preactivated catalyst was metered with propylene and mineral spirits to the first of three continuous stirred solution polymerization reactors operated in series at 1000 psig propylene pressure and 165° C. Total reactor residence time was 8 hours. The polymer solution discharged from the final reactor was filtered, concentrated to about 85% solids and pelletized. The product polymer exhibited a crystallinity of 90.7% as indicated by extraction with refluxing hexane. The hexane insoluble polymer exhibited at 230° C. flow rate of 10.0. The crystalline polymer yield was 1401 pounds polymer/pound total catalyst components or 1940 pounds polymer/pound TiCl$_3$. At an 8-hour residence time, this represents an average rate of 243 pounds polymer/pound TiCl$_3$/hour, or 175 pounds polymer/pound total catalyst/hr.

When the solution polymerization reactors were operated under comparable conditions using catalyst not subjected to preactivation by slurry prepolymerization as described above, the catalyst yield was 350 pounds polymer/pound total catalyst or 485 pounds polymer/pound TiCl$_3$. At the 8-hour residence time this represents an average rate of 60.6 pounds polymer/pound TiCl$_3$/hour or 43.8 pounds polymer/pound total catalyst/hour. The polymer produced using the non-preactivated catalyst exhibited a crystallinity of 86.5% as indicated by extraction with refluxing hexane and a crystalline polymer flow rate of 9.4. Comparison of physical properties for the polymers produced with the two catalysts of this example showed no significant differences.

EXAMPLE 6

This example illustrates that catalyst preactivation by prepolymerization of propylene under slurry conditions is applicable to other catalyst systems as well as the systems containing organopolylithiumaluminum compounds and α TiCl$_3$.

A preactivated catalyst containing hexamethylphosphoric triamide (HPT), aluminum triethyl, alpha-TiCl$_3$, and propylene prepolymer made under slurry polymerization conditions was prepared as follows:

To a 1000 ml. agitated reactor were charged 140 ml. mineral spirits, 2.1 g. Stauffer H grade TiCl$_3$ ($1.361 \times 10^{-2}$ moles), 0.7317 g. HPT ($4.08 \times 10^{-3}$ moles), and 8.5 ml. 25% AlEt$_3$ in heptane (1.554 g. or $1.361 \times 10^{-2}$ mole AlEt$_3$). The mixture was reacted with agitation under 25 psig. propylene pressure for 45 minutes without external heating. During the reaction period, the temperature of the mix increased from 23° C. to 55° C. The resulting catalyst mixture contained 7.34 g. slurry polypropylene/g. TiCl$_3$. The mixture was diluted to 350 ml. for use in evaluation under solution polymerization conditions.

A 33 ml. aliquot of the above preactivated catalyst (0.2 g. TiCl$_3$ at HPT/AlEt$_3$/TiCl$_3$ mole ratio 0.3/1.0/1) was charged to a 2-liter stirred stainless steel autoclave containing propylene at 1000 psig. and 160° C. with 800 ml. mineral spirits. Propylene pressure was maintained at 1000 psig. and autoclave temperature at 160° C. The reaction was run for 2 hours. At the end of the reaction period, the produce was dumped from the autoclave, cooled, washed with acetone, stabilized and dried. The resulting polymer powder weighed 278 g. and exhibited 80.6% crystallinity as determined by extraction of the powder with refluxing hexane. The polymer yield of 278 g. represents a polymerization rate of 695 g. polymer/g. TiCl$_3$/hr.

A control solution polymerization catalyzed by 0.2 g. TiCl$_3$ at HPT/AlEt$_3$/TiCl$_3$ mole ratio 0.3/1.0/1 was conducted identically to the above except that the catalyst was not preactivated by slurry prepolymerization of propylene. This run yielded 179 g. polymer (447 g. polymer/g. TiCl$_3$/hr.) which exhibited a powder hexane index crystallinity of 69.7.

The invention has been described in detail with particular reference to certain preferred embodiments thereof, but it will be understood that variations and modifications can be effected within the spirit and scope of the invention.

I claim:

1. In a solution process for polymerizing alpha-olefins containing at least three carbon atoms and mixtures of alpha-olefins containing at least three carbon atoms with ethylene to solid, high molecular weight polymer having a crystallinity of at least 70 percent which comprises contacting said alpha-olefin, at a temperature in the range of about 140° to about 300° C. and a pressure in the range of about atmospheric to about 2,000 atmospheres, with a catalyst mixture comprising (1) an organopolylithiumaluminum compound prepared by reacting lithium alkyl with at least one aluminum compound selected from the group consisting of aluminum trialkyl and dialkyl aluminum hydride, (2) an alkyl compound selected from the group consisting of lithium alkyl, aluminum trialkyl and dialkyl aluminum hydride and (3) the alpha form of titanium trichloride wherein the ratio of lithium to aluminum in the catalyst mixture is 0.1:1 to 4:1, the ratio of aluminum to titanium in the catalyst mixture is 0.1:1 to 1:1, and the ratio of lithium to titanium is 0.1:1 to 1:1; the improvement which comprises preactivating said catalyst mixture by initially polymerizing a small amount of propylene at a temperature of 0° C. to 80° C. with said catalyst mixture under slurry polymerizing conditions prior to using said catalyst in said solution process and thereafter adding said preactivated catalyst to a solution process being operated at a temperature of at least 140° C.

2. The process of claim 1 wherein said solid organipolylithiumaluminum compound is the reaction product of lithium alkyl and aluminum trialkyl.

3. The process of claim 2 wherein each alkyl radical of said aluminum trialkyl contains one to 12 carbon atoms.

4. The process according to claim 3 wherein said aluminum trialkyl is triethyl aluminum.

5. The process of claim 4 wherein said lithium alkyl is lithium butyl.

6. The process of claim 5 wherein said alkyl compound is lithium alkyl.

7. The process of claim 1 wherein said lithium alkyl is lithium butyl.

8. The process of claim 7 wherein propylene is polymerized to highly crystallizable polypropylene.

9. The process of claim 7 wherein propylene and ethylene are polymerized to form an ethylene/propylene block copolymer containing both crystallizable polymerized propylene segments and crystallizable polymerized ethylene segments.

* * * * *